United States Patent [19]

Nagasawa

[11] Patent Number: 5,427,175
[45] Date of Patent: Jun. 27, 1995

[54] DEHUMIDIFIER AIR CONDITIONER APPARATUS WITH INCREASED COMPRESSOR SPEED AND REHEAT

[75] Inventor: Atsushi Nagasawa, Shizuoka, Japan

[73] Assignee: Kabushiki Kaisha Toshiba, Kawasaki, Japan

[21] Appl. No.: 120,323

[22] Filed: Sep. 14, 1993

Related U.S. Application Data

[63] Continuation of Ser. No. 852,809, Mar. 17, 1992, abandoned, which is a continuation of Ser. No. 610,017, Nov. 7, 1990, abandoned.

[30] Foreign Application Priority Data

Nov. 9, 1989 [JP] Japan .................................. 1-291482

[51] Int. Cl.⁶ ............................................. F25B 29/00
[52] U.S. Cl. ........................................ 165/25; 165/29; 165/30; 62/176.5; 62/176.6; 62/228.4; 62/161; 236/44 C
[58] Field of Search ............... 62/176.5, 176.6, 228.4, 62/173, 161; 236/44 C; 165/25, 29, 30

[56] References Cited

U.S. PATENT DOCUMENTS 4,407,139 10/1983 Ide et al. ............................ 62/158
4,448,034 5/1984 Shimada et al. ..................... 62/161
4,744,223 5/1988 Umezu ............................. 62/228.4
4,869,073 9/1989 Kawai et al. ...................... 62/176.6

FOREIGN PATENT DOCUMENTS 0013652 2/1979 Japan ............................... 236/44 C
0134242 10/1980 Japan ............................... 236/44 C
0155113 9/1982 Japan .............................. 62/176.6
0008420 1/1983 Japan ................................. 62/173
0286643 11/1988 Japan ............................... 236/44 C Primary Examiner—John K. Ford
Attorney, Agent, or Firm—Foley & Lardner

[57] ABSTRACT

An air conditioner apparatus wherein the range of fluctuation of the difference between the room temperature and the desired preset temperature is divided into a plurality of zones, a variable capacity compressor being driven at frequencies respectively corresponding to these zones, and a heater is provided in an internal unit when a drying operation mode is selected and the room temperature is in a zone lower than the desired preset temperatures. The apparatus is further equipped with a switch that shifts the frequencies corresponding to the zones in the drying operation mode in the direction of an increasing dehumidification capacity.

4 Claims, 3 Drawing Sheets

ORDINARY DRYING

INCREASED CAPACITY DRYING

DEHUMIDIFIER AIR CONDITIONER APPARATUS WITH INCREASED COMPRESSOR SPEED AND REHEAT

This application is a continuation of application Ser. No. 07/852,809, filed Mar. 17, 1992, which is a continuation of application Ser. No. 07/610,017, filed Nov. 7, 1990, both now abandoned.

BACKGROUND OF THE INVENTION

1. Field of the Invention

The present invention relates, in general, to an air conditioner apparatus that dehumidifies by controlling current to a heater provided in an internal unit in a range in which the room temperature is lower than its set value.

2. Description of the Related Art

In most modern air conditioners, usually the range of fluctuation of the difference between the room temperature and the set temperature value is divided into a plurality of zones. Thus, the compressor used for refrigerant circulation is driven at a frequency corresponding to the respective zone. In this case, usually the compressor is stopped in the zone in which the room temperature is lower than the set value. However, compressor improvements have expanded the low end of the range of speeds in which the compressor operation is possible. Recently, air conditioners have appeared in which the compressor is operated at low speed even in the zone in which the room temperature is lower than the set value.

There are also air conditioners in which a heater is provided in the internal unit of the air conditioner. Thus, comfort is increased by controlling current to this heater in the initial period of the heating operation mode, or in the zone in which room temperature is lower than the set value in the drying operation mode.

For example, this type of air conditioner is found in Japanese Utility Model Disclosure (Kokai) No. 54-125152. In this conventional air conditioner, the room temperature is controlled by an ON/OFF operation of an electric heater in the drying operation mode. Furthermore, the compressor operating frequency in the zone in which the room temperature is lower than the set value is determined by the occupant of the room.

In this connection, in the case of a typical domestic air conditioner intended for a room with a floor area of about 10 square meters ($\approx$110 ft$^2$), assuming that the occupant of the room is alone, the compressor operating frequency is selected to be 12 Hz. In this case, even if the room is occupied by three people, the compressor continues to operate with the same frequency so long as the room temperature does not exceed the set value, so that even if the humidity is felt to be high, it is not possible to alter the dehumidifying capacity.

SUMMARY OF THE INVENTION

Accordingly, it is an object of the present invention to provide an improved air conditioner apparatus wherein the dehumidifying capacity can be raised without altering the set room temperature.

It is a further object of the present invention to provide an air conditioner apparatus that is capable of facilitating such operation.

In accordance with the present invention, the foregoing objects are achieved by providing an air conditioner apparatus comprising:

a refrigeration system including at least a variable capacity compressor, an external heat exchanger, an evacuation device, and an internal heat exchanger, all of which are coupled to each other;

a heater arranged in association with the internal heat exchanger;

a temperature setting device for setting a desired room temperature;

a temperature detecting device for detecting an actual room temperature;

a device for selecting a drying operation mode in which the dehumidification control of the room is to be performed;

a controller for outputting first control data for controlling the capacity of the variable capacity compressor by comparing temperature data preset by the temperature setting device with temperature data detected by the temperature detecting device, and outputting second control data for controlling current to the heater when the room temperature is lower than the preset room temperature in the drying operation mode;

a selector for selecting the condition whereby the dehumidification capacity is increased by controlling the variable capacity compressor in the drying operation mode.

BRIEF DESCRIPTION OF THE DRAWINGS

These and other objects and advantages of this invention will become more apparent from the following detailed description of the presently preferred embodiment of the invention, taken in conjunction with the accompanying drawings of which.

DETAILED DESCRIPTION OF THE PREFERRED EMBODIMENT

The preferred embodiment of the present invention will now be described in more detail with reference to the accompanying drawings.

Figure 1:
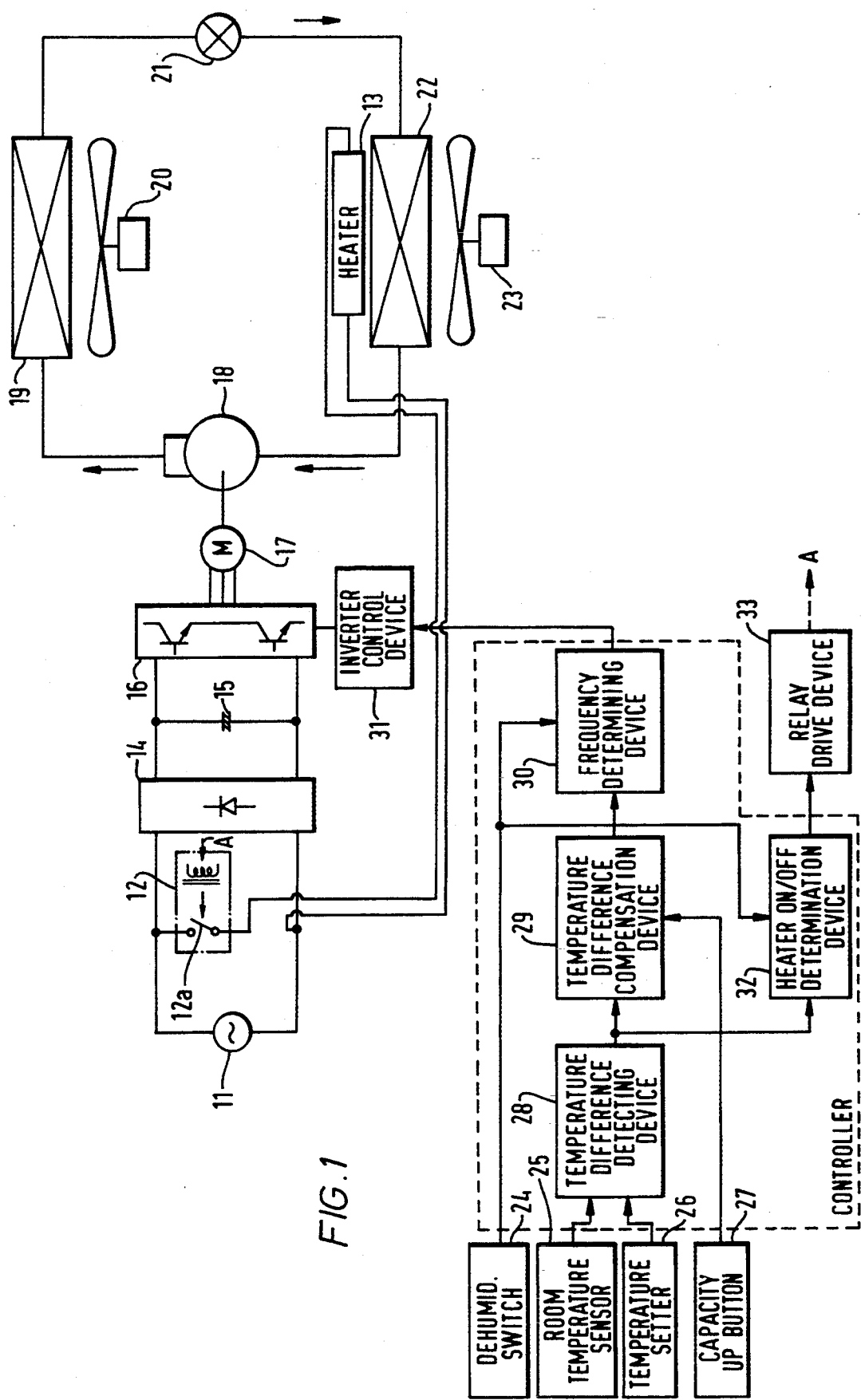
FIG. 1 is a block diagram showing the general layout of an embodiment of the present invention.

In FIG. 1, a heater 13 is connected to an AC power source 11 through the contact 12a of a relay 12. A converter 14 is also connected in parallel to the AC power source 11. The heater 13 is provided in the indoor unit. The heater 13 performs dehumidification in the drying operation mode, and, in the initial period of the heating operation mode, heats up the cold air that is blown out. The converter 14 consists of a diode bridge circuit that rectifies the AC input and outputs DC. A smoothing capacitor 15 is connected on the output side of the converter 14. Furthermore, an inverter 16 is connected to the converter 14. The inverter 16 converts the smoothed DC to AC of variable voltage and variable frequency. The AC output of this inverter 16 is applied to a compressor motor 17. The compressor motor 17 drives a compressor 18. The input side of the compressor 18 is connected to one side of an external heat exchanger 19. An external fan device 20 is disposed close to the external heat exchanger 19 for supplying air to the external heat exchanger 19. The other side of the external heat exchanger 19 is connected to one side of internal heat exchanger 22 through a decompression device, e.g., an expansion valve 21. The aforementioned heater 13 is arranged in the vicinity of the internal heat exchanger 22. An internal fan device 23 is disposed close to the internal heat exchanger 22 for supplying air to the internal heat exchanger 22. The other side of the internal heat exchanger 22 is connected to the output side of the compressor 18.

There are further provided a dehumidification switch 24, a room temperature sensor 25, a temperature setter 26 and a capacity up button 27. The dehumidification switch 24 is utilized for selecting the drying operation mode. The room temperature sensor 25 detects a room temperature. The room temperature setter 26 is utilized for setting room temperature. The capacity up button 27 is utilized for increasing dehumidifying capacity. In this case, the dehumidification switch 24, the temperature setter 26 and the capacity up button 27 are provided in a remote controller, but to simplify the description the elements associated with the remote control are omitted. The room temperature sensor 25 and the temperature setter 26 are connected to a temperature difference detecting device 28. The temperature difference detecting device 28 calculates the deviation between the room temperature and the set temperature value. A temperature difference compensation device 29 is connected to the temperature difference detecting device 28. The temperature difference compensation device 29 delivers an output compensating for the actual temperature difference in response to an ON signal from the capacity up button 27. The temperature difference compensation device 29 also is connected to a frequency determining device 30. The frequency determining device 30 determines the frequency of the compressor operation in accordance with each of the zones into which the range of fluctuation of temperature difference is divided and outputs a determined frequency signal. An inverter control device 31 controls the inverter 16 in accordance with the determined frequency signal. The frequency determining device 30 has a data table which stores frequency data corresponding to temperature differences for each operating mode. Thus, the frequency determining device 30 determines the compressor operating frequency by using this table. The temperature difference detection device 28 is connected to a heater ON/OFF determination device 32. The heater ON/OFF determination device 32 determines whether the heater 13 is to be connected or not depending on whether or not the drying operation mode is selected. Depending on its output, a relay drive device 33 controls excitation of the relay 12.

In operation, AC from the AC power source 11 is rectified by the converter 14, then smoothed by the smoothing capacitor 15. After that, smoothed current is converted to AC of variable voltage and variable frequency by the inverter 16 and fed to the compressor motor 17. The temperature difference detection device 28 calculates the deviation between the value detected by the room temperature sensor 25 and the value set by the temperature setter 26. The deviation is supplied to the temperature difference compensation device 29. If the capacity up button 27 has not been turned ON, the temperature difference signal is supplied without modification to the frequency determining device 30, through the temperature difference compensation device 29. The frequency determining device 30 then selects a data table in accordance with the operating mode, and, using this data table, determines the compressor operating frequency corresponding to the temperature difference. Thus, the inverter control device 31 controls the inverter 16 such that three-phase AC of this frequency is output.

The data tables selected in the drying operation mode by turning dehumidification switch 24 ON are as follows:

TABLE 1

| (when temperature difference decreases) | |
|---|---|
| Temperature difference | Compressor operating frequency |
| above +2.0° C. | 38 Hz |
| above +1.0° C. and below +2.0° C. | 28 Hz |
| above 0° C. and below +1.0° C. | 16 Hz |
| below 0° C. | 12 Hz |

TABLE 2

| (when temperature difference increases) | |
|---|---|
| Temperature difference | Compressor operating frequency |
| above +2.5° C. | 38 Hz |
| above +1.5° C. and below +2.5° C. | 28 Hz |
| above +0.5° C. and below +1.5° C. | 16 Hz |
| below +0.5° C. | 12 Hz |

Figure 2A:
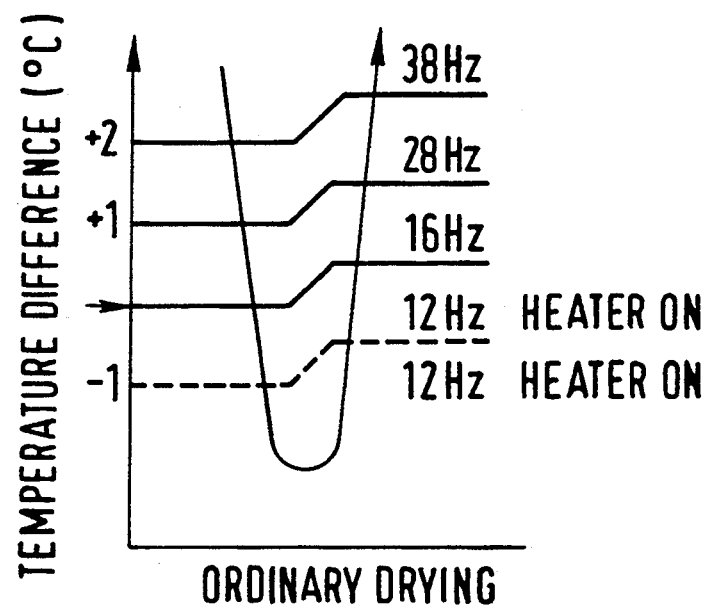
FIG. 2(a) and FIG. 2(b) are diagrams in explanation of the operation of the embodiment shown in FIG. 1, each showing the relationship between temperature difference and compressor operating frequency.
Figure 2B:
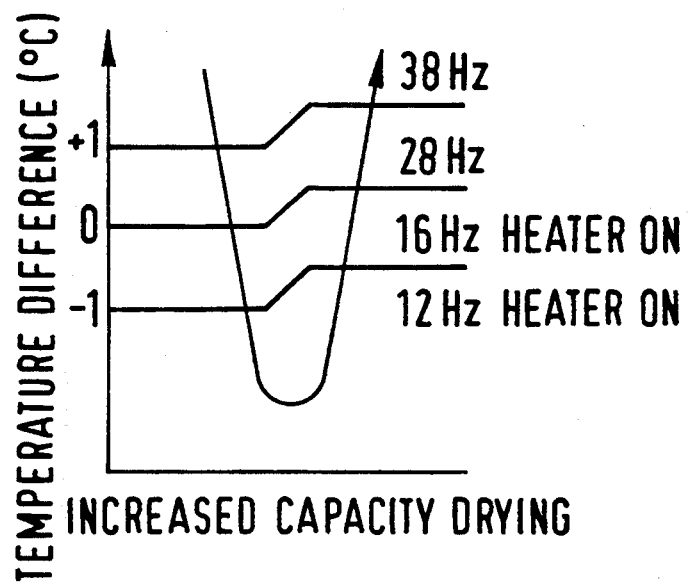

Based on the output of the temperature difference detection device 28, the heater ON/OFF determination device 32 outputs a heater ON command in the range where the room temperature is lower than the set temperature, under the condition that the drying operation mode has been selected by the dehumidification switch 24. Thus, the relay drive device 33 excites the relay 12. As a result, as shown in FIG. 2(a), the compressor motor 17 is operated with the frequency of the data table shown in Table 1 when the temperature difference is on a falling trend and is operated with the frequency of the data table shown in Table 2 when the temperature difference is on a rising trend. When the room temperature is less than the set value, the dehumidifying operation is performed by connecting the heater 13 while the compressor motor 17 is operated at 12 Hz. In this state, if the capacity up button 27 is turned ON because it is felt that the humidity is high, the temperature difference compensation device 29 delivers an output in which a zone step is added to the temperature difference signal from the temperature difference detection device 28. The frequency determining device 30 therefore outputs a frequency signal that is shifted in the direction of increasing capacity from the frequency signal that would normally correspond to the actual temperature difference. As a result, as shown in FIG. 2(b), the compressor motor 17 is driven with increased dehumidification capacity, with the frequency shifted by a step corresponding to one zone.

Figure 3:
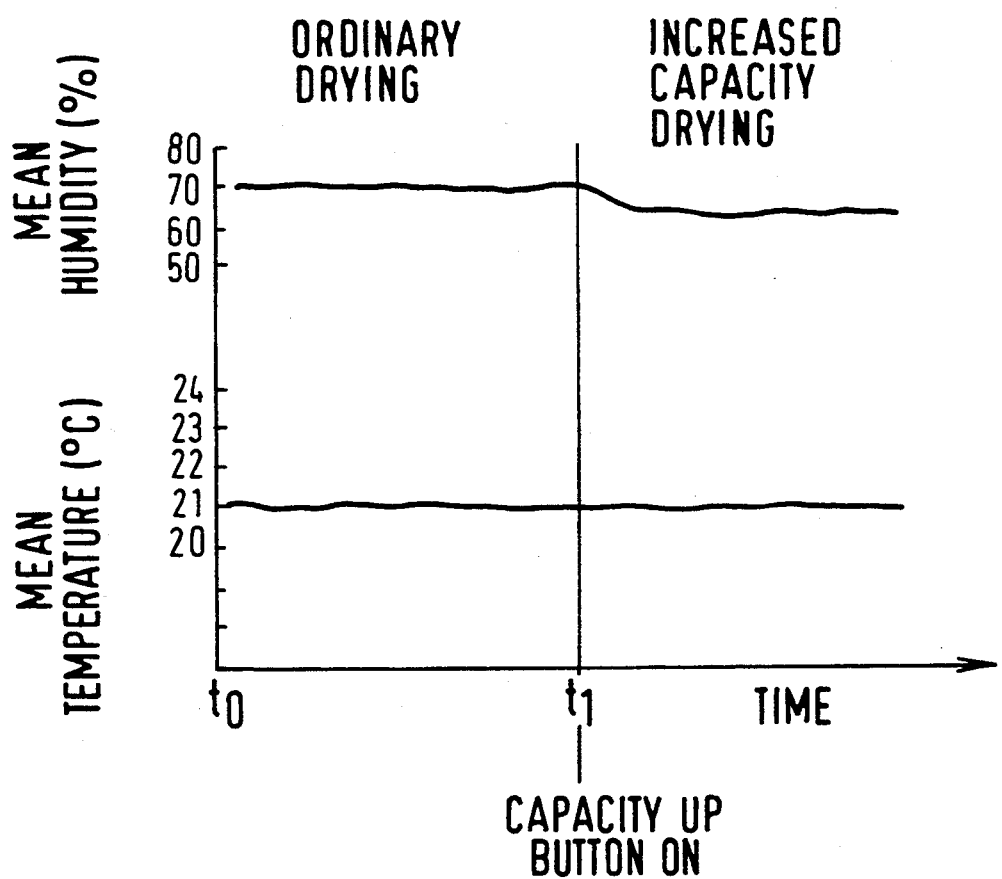
FIG. 3 is a graph showing the relationships between mean room humidity and mean temperature and time, in explanation of the action of the present invention.

FIG. 3 shows how the mean room humidity and the mean temperature change, depending on whether or not the capacity up button 27 is turned ON, in the drying operating mode. In this case, it is assumed that the drying operation is performed from time $t_0$, when the occupancy of the room is high and there is high humidity. Accordingly, when the capacity up button 27 is pressed at time $t_1$, only the humidity is lowered, the temperature staying unaltered. It has been found that, with an ordinary domestic air conditioner, for a room with a floor area of 10 square meters, if there are three occupants, the humidity can be kept in a satisfactory range by operating the compressor motor 17 at 16 Hz.

Thus, with this embodiment, the dehumidification capacity can be raised simply by operating a switch when it is felt that the humidity in the room is high. In the above embodiment, a correction is applied to the temperature difference signal that is output from the temperature difference detection device 28 so as to shift the frequency in the direction of increasing capacity by a step corresponding to one zone. Instead, it would be possible to prepare a data table for the frequency determining means 30 giving higher frequencies corresponding to each zone, so that when the capacity up button 27 is operated, the compressor drive frequency would be determined using this data table with higher frequencies.

Numerous other modifications and variations of the present invention are possible in light of the above teachings. It is therefore to be understood that, within the scope of the appended claims, the present invention can be practiced in a manner other than as specifically described herein.

What is claimed is:

1. An air conditioner apparatus, comprising:
   a cooling system including a compressor having a variable capacity, an external heat exchanger, an expansion device and an internal heat exchanger, said compressor, said heat exchanger and said expansion device being intercoupled;
   a heater for heating air provided to a room from the area of said internal heat exchanger;
   temperature setting means for setting desired temperatures of said room;
   temperature detecting means for detecting actual temperatures of said room;
   means for selecting a drying operating mode for said cooling system in which dehumidification control of air in said room is performed;
   control means, responsive to selection of said drying operation mode, for outputting first control data for controlling said variable capacity of said compressor and, when an actual temperature of said room is lower than a set desired temperature of said room in said drying operation mode, for outputting second control data for controlling said heater,
   said control means calculating temperature differences between said actual temperatures detected by said temperature detecting means and said desired temperatures set in said temperature setting means, respectively,
   said temperature differences comprising a plurality of separate temperature difference zones,
   said control means determining said first control data in correspondence with said separate temperature difference zones, respectively; and
   manual operation means for shifting said first control data in correspondence with said separate temperature difference zones in a direction for increasing said variable capacity of said compressor in said drying operation mode.

2. An apparatus according to claim 1, further including:
   a heater driver, responsive to said second control data from said control means, for driving said heater.

3. An apparatus according to claim 1, wherein:
   said control means comprises determining means for determining said first control data, said determining means including a data table for pre-storing said first control data according to an operating mode of said apparatus and in correspondence with said separate temperature difference zones, respectively.

4. An apparatus according to claim 3, wherein:
   said data table pre-stores different values of said first control data in correspondence with said separate temperature difference zones for said temperature differences increasing or decreasing, respectively.

* * * * *